United States Patent
Chuang

(10) Patent No.: US 8,229,001 B2
(45) Date of Patent: Jul. 24, 2012

(54) METHOD AND SYSTEM FOR CALCULATING FLAG PARAMETER OF IMAGE BLOCK

(75) Inventor: Eric Chuang, Taipei (TW)

(73) Assignee: Via Technologies, Inc., Taipei (TW)

( * ) Notice: Subject to any disclaimer, the term of this patent is extended or adjusted under 35 U.S.C. 154(b) by 995 days.

(21) Appl. No.: 12/202,652

(22) Filed: Sep. 2, 2008

(65) Prior Publication Data
US 2009/0060049 A1   Mar. 5, 2009

(30) Foreign Application Priority Data
Sep. 5, 2007   (TW) ............................. 96132973 A

(51) Int. Cl.
H04N 7/12 (2006.01)
H04N 11/02 (2006.01)
H04N 11/04 (2006.01)
G06F 9/26 (2006.01)
G06F 9/34 (2006.01)

(52) U.S. Cl. ......... 375/240.25; 375/240.12; 375/240.24; 375/240.29; 348/411.1; 348/420.1; 711/204; 711/209

(58) Field of Classification Search ............... 375/240.18–240.25, 241, 240.12, 375/240.29; 348/403.1–404.1, 411.1, 420.1; 711/202–209
See application file for complete search history.

(56) References Cited

U.S. PATENT DOCUMENTS

| 6,373,884 | B1 * | 4/2002 | Byrns ........................... 375/219 |
| 6,396,536 | B1 | 5/2002 | Howell et al. |
| 2003/0043905 | A1 | 3/2003 | Nakayama et al. |
| 2003/0235251 | A1 * | 12/2003 | Hsiun et al. .................... 375/245 |
| 2004/0037360 | A1 | 2/2004 | Moon |
| 2005/0262375 | A1 * | 11/2005 | Schumann .................... 713/500 |
| 2005/0281339 | A1 * | 12/2005 | Song ........................ 375/240.24 |
| 2008/0013623 | A1 * | 1/2008 | Wang et al. ................ 375/240.1 |

FOREIGN PATENT DOCUMENTS

| JP | 2002-051221 | 2/2002 |
| JP | 2002-142225 | 5/2002 |
| JP | 2003-209697 | 7/2003 |

* cited by examiner

*Primary Examiner* — Alpus H Hsu
*Assistant Examiner* — Jeremy Costin
(74) *Attorney, Agent, or Firm* — Kirton McConkie; Evan R. Witt

(57) ABSTRACT

A flag parameter in a digital image decoding is calculated. For a macroblock consisting of M×N blocks, a first operation is performed on M block along a first edge to obtain M first parameters, and a second operation is performed on N blocks along a second edge to obtain N second parameters. The first and second parameters are stored into corresponding locations in a first and a second buffer array. Then a flag parameter corresponding to a given block is calculated according to corresponding values stored in the first and second buffer arrays. Calculation for all of the M×N blocks is performed in the order that neighboring left and upper blocks next to the give block is processed prior to the given block.

16 Claims, 4 Drawing Sheets

METHOD AND SYSTEM FOR CALCULATING FLAG PARAMETER OF IMAGE BLOCK

FIELD OF THE INVENTION

The present invention relates to a method and a system for calculating a flag parameter, and more particularly to a method and a system for calculating a flag parameter in a decoding process of a digital image.

BACKGROUND OF THE INVENTION

The idea of video compression is to omit certain data of an image that are imperceptible to human's eyes, i.e. so-called visual redundancy. The data to be omitted are generally similar to other data in space or time dimension, and thus can be removed according to a compression algorithm. H.264/AVC is one of the mainstream standards of video compression. Compared to conventional digital video compression standards, such as MPEG-2, MPEG-4 or H.263, H.264 exhibits higher compression performance, and nevertheless reaches better image quality under the same compression ratio.

The coding mechanism of H.264/AVC compression is block-based. In brief, an image frame is divided into a plurality of rectangular areas called as macroblocks (MB). The macroblocks are then encoded. First, intra-frame prediction and inter-frame prediction techniques are used to remove the similarities between images so as to obtain the residual differences. Then the residual differences are spatially transformed and quantized to remove the visual redundancy.

An important factor of the high compression efficiency in H.364/AVC is the utilization of context adaptive binary arithmetic coding (CABAC). Please refer to FIG. 1A, in which the operation of a CABAC decoder is briefly illustrated. For CABAC decoding, the decoder 10 executes a decoding operation for each block to generate a corresponding coded_block_flag parameter. The coded_block_flag parameter indicates whether a given block contains any non-zero residual difference or not. If there is no residual difference, the coded_block_flag parameter is set to "0" for the given block. Otherwise, the coded_block_flag parameter is set to "1" if there exists non-zero residual difference in the given block.

The decoding operation of the decoder 10 is based on a context ID which includes a base portion and an offset portion. The base portion can be obtained by a lookup table, but the offset portion is calculated from the coded_block_flag. Therefore, a key point to calculate the coded_block_flag parameter is to obtain corresponding offset portion. For calculating the offset operation, the coded_block_flag parameters of neighboring left and top blocks next to the target block have to be determined in advance. For example, as illustrated in FIG. 1B, an image frame 11 encoded in H.264 is divided into a plurality of macroblocks 12, and each of the macroblock 12 is further divided into a plurality of blocks 13, e.g. M×N blocks K11~Kmn. For example, M=N=4 as illustrated in FIG. 1C shows the macroblock 12 is divided into 16 blocks labeled as 0~15 and each of the blocks 0~15 includes 4×4 pixels. The offset value of each block 13 is calculated according to coded_block_flag parameters of the neighboring left and top blocks of the current block.

Due to the reason that characteristics of neighboring left or top blocks of each block may be different (e.g. size of each, inter or intra macroblock), H.264 utilizes a universal algorithm for calculating the offset value of all blocks. This would result in huge and complex computation since every block demands repeated processing. Consequently, hardware resource is occupied and causes large consumption of time. It can be realized that there exists a need to solve such deficiency.

SUMMARY OF THE INVENTION

Therefore, the present invention provides a simplified method and device for calculating a flag parameter.

The present invention provides a method for calculating a flag parameter in a digital image decoding, wherein the method comprises: receiving a macroblock comprising M×N blocks K11~Kmn; performing a first operation on M block K11~Km1 along a first edge in a first direction to obtain corresponding M first parameters A11~Am1; storing the first parameters A11~Am1 into corresponding locations in a first buffer array; performing a second operation on N blocks K11~K1n along a second edge in a second operation to obtain corresponding N second parameters B11~B1n; storing the second parameters B11~B1n into corresponding locations in a second buffer array; calculating a flag parameter corresponding to a given block according to corresponding values stored in the first and second buffer arrays according to a third operation; storing the flag parameter into location corresponding to a neighboring right block next to the given block in the first buffer array and location corresponding to a neighboring lower block next to the given block in the second buffer array; repeating steps f and g for each of the M×N blocks in the order from blocks along a left most edge, to blocks along a top most edge, blocks along a second left edge, blocks along a second top edge and so on.

The present invention also provides a system for calculating a flag parameter in a digital image decoding, wherein the system comprises: a buffer configured with a plurality of arrays for storing flag parameters of a plurality of blocks within a macroblock into corresponding locations; and a computation unit coupled to the buffer and configured to perform a plurality of operations to obtain offset values corresponding to the plurality of blocks based on the flag parameters stored in the buffer.

The present invention further provides a method for updating flag parameters in CABAC processing, wherein the method comprises: providing two buffer arrays having locations corresponding to a plurality of blocks respectively; storing with first parameters corresponding to a first plurality of blocks along a left most edge of the macroblock in the first buffer array; storing with second parameters corresponding to a second plurality of blocks along a top most edge of the macroblock in the second buffer array; and updating the first and second buffer arrays with flag parameters corresponding to the plurality of blocks obtained by an operation performed on each of the plurality of blocks within the macroblock in a specific order; wherein the specific order is arranged that neighboring left and upper blocks next to a given block are processed prior to the given block.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described in more detail with reference to the following embodiments. It is to be noted that the following descriptions of preferred embodiments of this invention are presented herein for purpose of illustration and description only; it is not intended to be exhaustive or to be limited to the precise form disclosed.

Figure 1A:
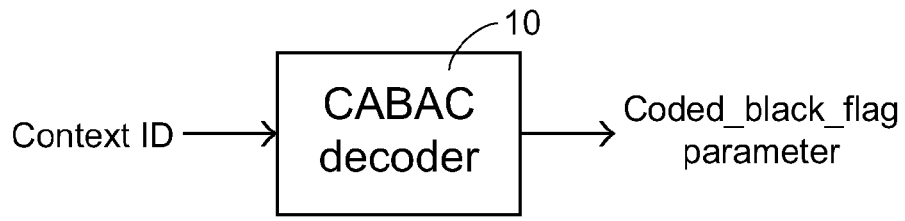
FIG. 1A is a scheme illustrating a typical operation of a CABAC decoder.
Figure 1B:
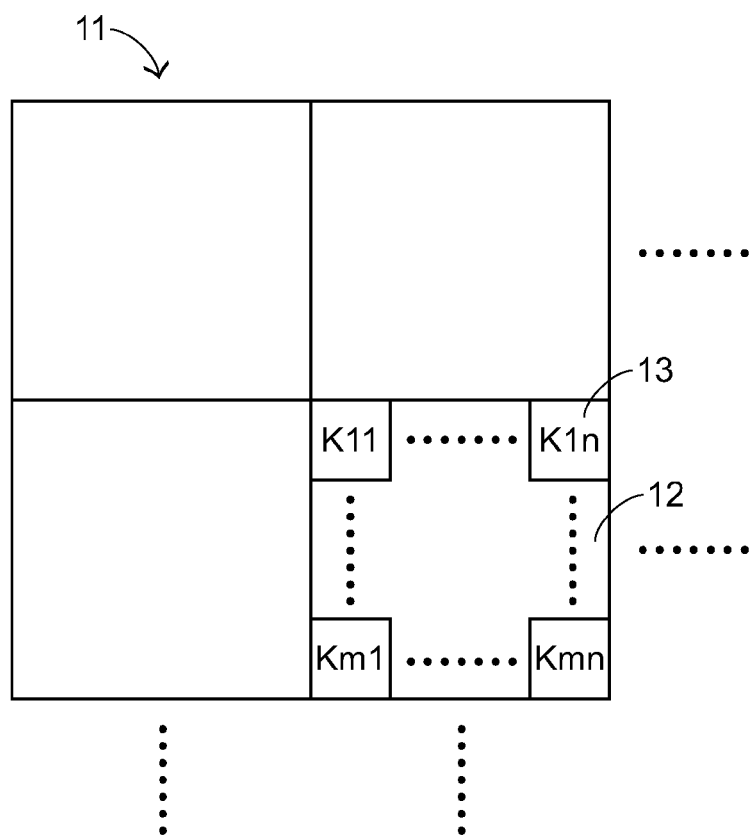
FIG. 1B is a scheme illustrating the division of a digital image into macroblocks and further smaller blocks.
Figures 1C, 2:
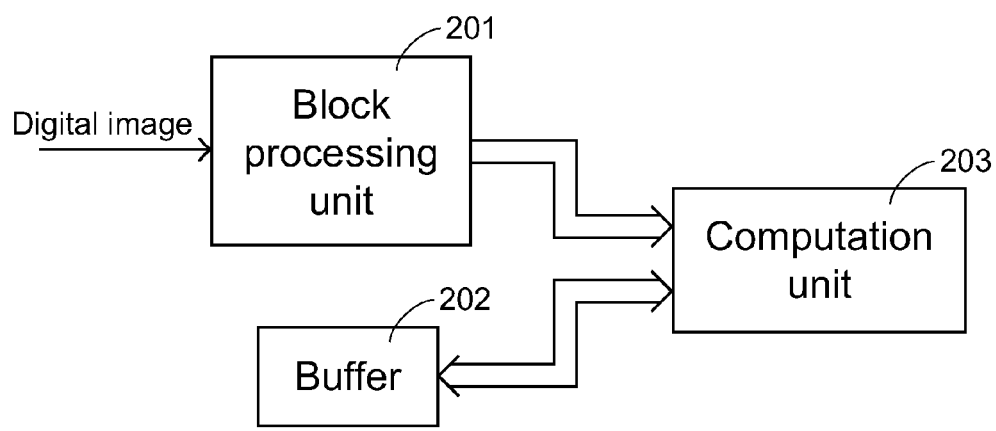
FIG. 1C is a scheme illustrating associated macroblocks of the digital image of FIG. 1B for calculating coded_block_flag parameters in a decoding process of the digital image.
FIG. 2 is a block diagram of a system for calculating coded_block_flag parameters in a decoding process of a digital image according to an embodiment of the present invention.
Figure 3:
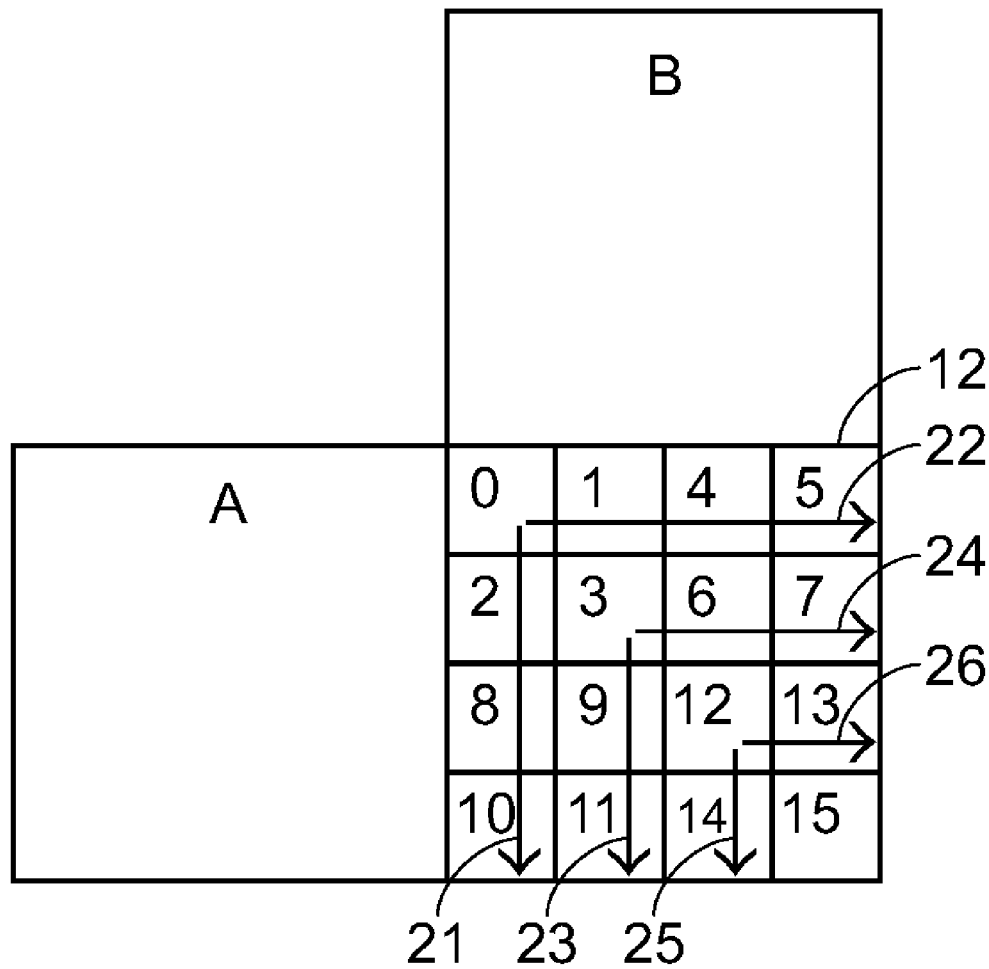
FIG. 3 is a scheme illustrating an exemplified sequence for calculating the coded_block_flag parameters of the digital image of FIG. 1B and FIG. 1C.

Referring to FIG. 2 first, an embodiment of a system for calculating coded_block_flag parameters according to the present invention is shown. The system 200 comprises a block processing unit 201, a buffer 202 and a computation unit 203. The system 200 may be configured to process the image blocks as shown in FIG. 3 for calculating the coded_block_flag parameters.

As previously described, for calculating offset values of the blocks, coded_block_flag parameters of two neighboring left and top blocks have to be determined first. For example, the offset value of block 3 is determined according to coded_block_flag parameters of block 1 and block 2; the offset value of block 6 is determined according to coded_block_flag parameters of block 3 and block 4; offset value of Block 7 is determined according to coded_block_flag parameters of block 5 and block 6; and so on. However, it can be observed that the determination of coded_block_flag parameter for blocks 3, 6, 7, 9, 11, 12, 13, 14 and 15 does not require complex processing and it is easier to obtain necessary information. Thus the present invention makes use of the observation to simplify processing of coded_block_flag parameters.

According to an embodiment of the present invention, when the block processing unit 201 receives a digital image, e.g. image as shown in FIGS. 1B and 1C. The digital image may comprise a plurality of macroblocks, and each of the macroblock further comprises M×N blocks K11~Kmn. The buffer 202 includes two buffer arrays nA[16] and nB[16] corresponding to the blocks K11~Kmn for storing coded_block_flag parameters of the neighboring left and upper blocks next to a given block, respectively. In an embodiment of the present invention, each of the buffer arrays includes 16 units, and each of the unit may store 1 bit of data. That is, a total of 32 bits can be stored. The pair of coded_block_flag parameters corresponding to the given block together forms the offset value of the given block. Then the offset value will be combined with corresponding base value of the given block so as to determine the coded_block_flag parameter.

The computation unit 203 is coupled to the block processing unit 201 and buffer 202, and is configured to implement various operations. In an embodiment of the present invention, the computation unit 203 may perform a first operation, a second operation and a third operation on the current macroblock being processed to obtain relating coded_flag_parameters. The macroblock comprises M×N blocks K11~Kmn, such as 4×4 blocks 0~15 as shown in FIG. 3. The first operation is performed on blocks along a first edge in a first direction, the second operation is performed on blocks along a second edge in a second direction, and the third operation is performed on every block of the current macroblock in a specific order. The resulting parameters are written and/or updated to the corresponding location in the buffer array 202.

As explained, for blocks lying within a macroblock, such as blocks, 3, 6, 7, 9, 11, 12, 13, 14 and 15 in FIG. 1C and FIG. 3, coded_block_flag parameters of the neighboring left and upper blocks need not be obtained by the conventional method and may take advantage of prior determined parameters. But for blocks lying on the left most and top most edges of the macroblock, such as blocks 0, 1, 2, 4, 5, 8 and 10 in FIG. 1C and FIG. 3, reference must be made to the macroblocks at left or at top (i.e. macroblock A and/or B) of the current macroblock. As a result, once the coded_block_flag parameters of blocks on the left most and top most edges are determined, calculation of the remaining blocks may be simplified using these determined parameters without repeating same processing for every block. Efficient computation can be thus achieved as well as reduction of time.

In the following, procedures of the operations will be described in further detail. For the first operation, M blocks K11~Km1 on the first edge in the first direction are processed to obtain respective first parameters A11~Am1. The first parameters A11~Am1 represent coded_block_paramteters of the neighboring left blocks next to the M blocks K11~Km1 respectively. In the embodiment of FIG. 3, these M blocks are blocks 0, 2, 8 and 10 on the left most edge. For each of the blocks 0, 2, 8 and 10, coded_block_flag parameters of the neighboring left block (lying within macroblock A) are calculated. The resulting first parameters are then written to corresponding locations nA[0], nA[2], nA[8] and nA[10] in the buffer 202 respectively. Here the first operation can be the universal algorithm adopted in H.264 and hence will be omitted for simplicity. One with ordinary skill in the art may appreciate the underlying mechanism.

Figure 4A:
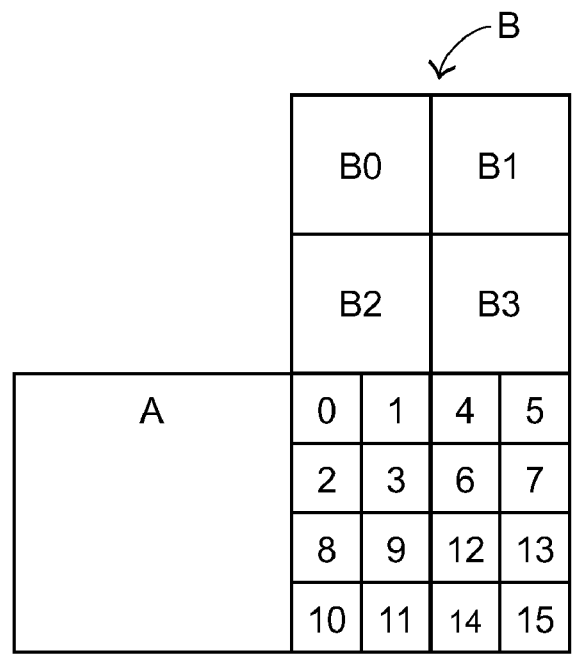
FIG. 4A is a scheme exemplifying a block-dividing manner of the digital image of FIG. 1B and FIG. 1C.
Figure 4B:
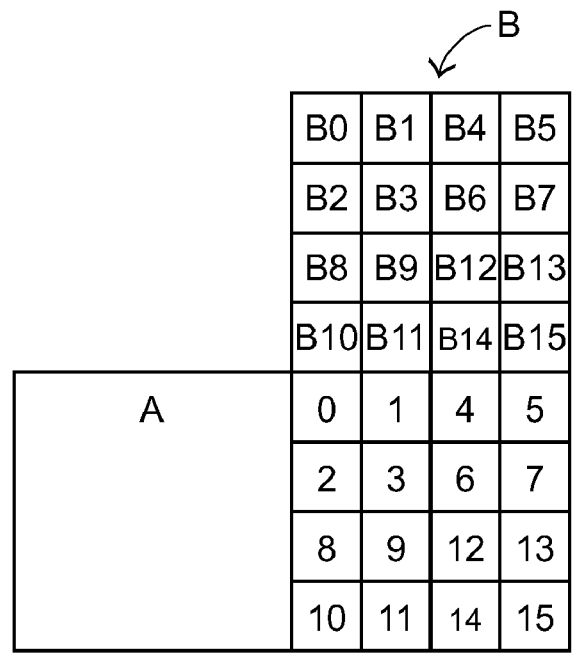
FIG. 4B is a scheme exemplifying another block-dividing manner of the digital image of FIG. 1B and FIG. 1C.

Next, the second operation is performed on N blocks K11~K1n on the second edge in the second direction to obtain respective second parameters B11~B1n. The second parameters B11~B1n represent coded_block_parameters of the neighboring upper blocks (lying within macroblock B) next to the N blocks K11~K1n. In the embodiment of FIGS. 1C and 3, the second edge is taken as the top most edge having blocks 0, 1, 4 and 5. The resulting second parameters are then written to corresponding locations nB[0], nB[1], nB[4] and nB[5] in the buffer 202 respectively. Determination of the second operation or a given block is described as follows.

a. In the case that the neighboring upper macroblock B does not exist, the coded_block_flag parameter of the neighboring upper block next to blocks 0, 1, 4, 5 is set to 0, i.e.

nB[0]=nB[1]=nB[4]=nB[5]=0;

b. In the case that macroblock B is an inter-MB, the current macroblock is an intra-MB and is transmitted by data partition, and a constrained intra prediction flag (constrained_intra_pred_flag) corresponding to the given block is set to "1"; the coded_block_flag parameter of the neighboring upper block next to blocks 0, 1, 4, 5 is set to 0, i.e.

nB[0]=nB[1]=nB[4]=nB[5]=0;

c. In the case that macroblock B is encoded in intra-frame pulse code modulation (I-PCM), the coded_block_flag parameter of the neighboring upper block next to blocks 0, 1, 4, 5 is set to 1, i.e.

nB[0]=nB[1]=nB[4]=nB[5]=1;

d. In the case that macroblock B consists of four blocks B0, B1, B2 and B3, each having 8×8 pixels, as illustrated in FIG. 4A:

For blocks 0 and 1, the coded_block_flag parameter of block B2 is used and written to nB[0] and nB[1] in response to bit 2 of a coded block pattern (CBP) of macroblock B is set to 1; otherwise, the coded_block_parameters are set to 0 (i.e. nB[0]=nB[1]=0); and For blocks 4 and 5, the coded_block_flag parameter of block B3 is used and written to nB[4] and nB[5] in response to bit 3 of CBP of macroblock B is set to 1; otherwise, the coded_block_parameters are set to 0 (i.e. nB[4]=nB[5]=0); and e. In the case that none of the above conditions is true and macroblock B consists of four Blocks B0~B16, each having 4×4 pixels, as illustrated in FIG. 4B:

For blocks 0 and 1, the coded_block_flag parameters of blocks B10 and B11 are used and written to nB[0] and nB[1] respectively in response to bit 2 of CBP of macroblock B is set to 1; otherwise, the coded_block_parameters are set to 0 (i.e. nB[0]=nB[1]=0); and For blocks 4 and 5, the coded_block_flag parameters of blocks B14 and B15 are used and written to nB[4] and nB[5] respectively in response to bit 3 of CBP of macroblock B is set to 1; otherwise, the coded_block_flag parameters are set to 0 (i.e. nB[4]=nB[5]=0).

The second operation is much simplified than the conventional first operation due to the reason that in macroblock-adaptive frame/field (MBAFF) encoding, H.264 is more flexible about the format of the neighboring left macroblock. In order to cope with the variety, the first operation adopts the conventional method. However, for an embodiment that needs only meet baseline requirement without using full MBAFF encoding, the first operation can be simplified the same as the second operation so as to reach fast computation.

After the first and second operations are performed, coded_block_flag parameters that would be referenced by blocks on the first and second edges are obtained and stored in corresponding position within the buffer 202. The third operation can proceed on each of the blocks K11~Kmn by use of the stored parameters. In brief, the order of the third operation is arranged so that a given block will not be processed unless the neighboring left and upper blocks next to the given block have been processed and corresponding coded_block_flag parameters have been written or updated in the buffer arrays nA[16] and nB[16]. Then the offset value is calculated as offset(x)=nA[x]+2×nB[x] for the given block x. Consequently, the context ID of the given block can be determined as context ID(x)=base+offset(x).

The CABAC decoder 10 as shown in FIG. 1 may decode the context ID and thus generate the corresponding coded_block_flag parameter of the given block. Furthermore, the coded_block_flag parameter of the given block is written or updated into corresponding locations of the buffer arrays for the use of other blocks that need reference to the value, which are blocks at the right of and lower to the given block. In such way, computation can be largely reduced and thus performance is improved without repeating complex processing for every block.

Please refer to FIG. 3, an embodiment of the third operation according to the present invention is described. Following the first and second operations, coded_block_flag parameters of neighboring left or upper blocks next to blocks 0, 1, 2, 4, 5, 8, 10 are determined and stored in nA[0], nA[2], nA[8], nA[10], nB[0], nB[1], nB[4] and nB[5] of the buffer 202. Starting from block 0, a pair of coded_block_flag parameters stored in nA[0] and nB[0] corresponding to the upper-left block 0 are obtained, the computation unit 203 further performs the third operation to obtain the offset value and further processes the offset value into a coded_block_flag parameter P11 of block 0. The procedure is executed as follows:

a. Set the offset value of block 0=nA[0]+2×nB[0];

b. Calculate context ID of block 0=base value+offset value of block 0; and c. The CABAC decoder 10 decodes context ID of block 0 into the coded_block_flag parameter P11 of Block 0.

After the coded_block_flag of block 0 is decoded, it is stored in a corresponding location at nA[1] for block 1 and nB[2] for block 2. As can be observed, block 0 is the neighboring left block next to block 1 and the neighboring upper block next to block 2. Both blocks 1 and 2 will need reference to the coded_block_flag parameter of block 0, thus the value is stored in nA[1] and nB[2] for later use.

Likewise, the coded_block_flag parameter P12 of block 1 can be obtained according to the P11 of block 0 stored in nA[1] and the value in nB[1] determined in the second operation:

offset value of block 1=*nA[1]*+2×*nB[1]*; and context ID of block 1=base value+offset value of block 0.

Then the CABAC decoder 10 decodes context ID of block 1 into coded_block_flag parameter P12 of block 1 and stores the value in nA[4] and nB[3]. As can be understood, block 1 is the neighboring left block to block 4 and the neighboring upper block to block 3.

Similarly, the coded_block_flag parameter P21 of block 2 can be obtained according to the value stored in nA[2] during the first operation and the P11 of block 0 stored in nB[2]:

the offset value of block 2=*nA[2]*+2×*nB[2]*; and context ID of block 2=base value+offset value of block 2.

The CABAC decoder 10 decodes context ID of Block 2 into coded_block_flag parameter P12 of block 2 and store the value in nA[3] and nB[8]. As can be understood, block 2 is the neighboring left block to block 3 and the neighboring upper block to block 8.

Accordingly, after the coded_block_flag parameters of blocks on the left most and top most edges in a current macroblock are calculated through the first and second operations, coded_block_flag parameters of all the blocks in the current macroblock can be obtained based on coded_block_flag parameters of neighboring left and upper blocks. Since the second and third operations are simplified, the efficiency for calculating the coded_block_flag parameters can be improved.

In the embodiment of FIG. 3, the third operation is performed in the order from direction 21, to 22, 23, . . . , till 26. It should be noticed that the present invention is not limited to this embodiment, but instead, other variations may be adopted without departing from the spirit of the present invention. The ordering of blocks 0~15 in the third operation needs only meet the requirement that neighboring left and upper blocks next to a given block are processed prior to the given block. For example, block 3 is processed later than blocks 1 and 2, and block 14 is processed later than blocks 11 and 12. By utilizing the buffer arrays nA[16] and nB[16] for storing coded_block_flag parameters of the neighboring left and upper blocks, offset value of a given block can be determined through direct access to the buffer 202 without complex computation.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for calculating a flag parameter in a digital image decoding, the method comprising steps of:
   a) receiving a macroblock comprising M×N blocks K11~Kmn, wherein M, N, m and n are positive integral numbers which are greater than 1 respectively;
   b) performing a first operation on M blocks K11~Km1 along a first edge in a first direction to obtain corresponding M first parameters A11~Am1;
   c) storing the first parameters A11~Am1 into corresponding locations in a first buffer array;
   d) performing a second operation on N blocks K11~K1$n$ along a second edge in a second direction to obtain corresponding N second parameters B11~B1$n$;
   e) storing the second parameters B11~B1$n$ into corresponding locations in a second buffer array;
   f) calculating a flag parameter corresponding to a given block according to corresponding values stored in the first and second buffer arrays according to a third operation;
   g) storing the flag parameter into a location corresponding to a neighboring right block next to the given block in the first buffer array and a location corresponding to a neighboring lower block next to the given block in the second buffer array; and
   h) repeating the steps f) and g) for each of the M×N blocks in the order from blocks along a left most edge, to blocks along a top most edge, then to blocks along a second left edge, and then to blocks along a second top edge.

2. The method according to claim 1, wherein the second operation in the step d) comprises sub-steps of:
   d1) setting the second parameters B11~B1$n$ to 0 on a condition that a neighboring upper block next to the macroblock does not exist;
   d2) setting the second parameters B11~to B1$n$ to 0 on conditions that the neighboring upper block exists and is an intra-MB, the macroblock is an inter-MB and is transmitted by data partition, and a constrained inter prediction flag is 1;
   d3) setting the second parameters B11~B1$n$ to 1 on a condition that the neighboring upper block is inter-pulse-coded modulated; and
   d4) setting the second parameters B11~B1$n$ to flag parameters of corresponding blocks within a neighboring upper macroblock located upper to the N blocks K11~K1$n$ according to a coded block pattern on a condition that none of the steps d1)~d3) is executed.

3. The method according to claim 2, wherein the first operation is the same as the second operation in response to macroblock adaptive frame/field encoding not being used.

4. The method according to claim 1, wherein the first edge is a left most edge and the second edge is a top most edge of the macroblock.

5. The method according to claim 1, wherein the third operation comprises:
   calculating an offset value of the given block by combining corresponding values stored in the first and second buffer arrays;
   calculating a context ID of the given block by combining the offset value of the given block and a base value; and
   decoding the context ID to obtain the flag parameter of the given block.

6. The method according to claim 5, wherein the offset value is calculated by combing the value in the first buffer array with double of the value in the second buffer array, and the base value is obtained by a lookup table.

7. The method according to claim 1, wherein the first operation is performed with reference to flag parameters and status of a neighboring left macroblock next to the macroblock.

8. A system for calculating a flag parameter in a digital image decoding, the system comprising:
   a buffer configured with a plurality of arrays for storing flag parameters of a plurality of blocks within a macroblock into corresponding locations; and
   a computation unit coupled to the buffer and configured to perform a plurality of operations to obtain offset values corresponding to the plurality of blocks based on the flag parameters stored in the buffer, wherein the computation unit is configured to perform a first operation on a plurality of first blocks along a left most edge of the macroblock, is configured to perform a second operation on a plurality of second blocks along a top most edge of the macroblock, and is configured to perform a third operation on each of the plurality of blocks within the macroblock in an order that neighboring left and upper blocks next to a given block are processed prior to the given block;
   wherein the third operation comprises: calculating the offset value of the given block by combining corresponding values stored in the first and second buffer arrays;
   calculating a context ID of the given block by combining the offset value of the given block and a base value;
   decoding the context ID to obtain the flag parameter of the given block; and storing the flag parameter of the given block into a location corresponding to a neighboring right block next to the given block in a first buffer array and a location corresponding to a neighboring lower block next to the given block in a second buffer array.

9. The system according to claim 8, wherein the first operation is performed to obtain and store the flag parameters corresponding to the first blocks in a first buffer array of the buffer, and the second operation is performed to obtain and store the flag parameters corresponding to the second blocks in a second array of the buffer.

10. The system according to claim 8, wherein the second operation comprises:
    setting second parameters B11~B1$n$ to 0 on a condition that a neighboring upper block next to the macroblock does not exists;
    setting the second parameters B11~to B1$n$ to 0 on conditions that the neighboring upper block exists and is an intra-MB, the macroblock is an inter-MB and is transmitted by data partition, and a constrained inter prediction flag is 1;
    setting the second parameters B11~B1$n$ to 1 on a condition that the neighboring upper macroblock is inter-pulse-coded modulated; and
    otherwise, setting the second parameters B11~B1$n$ to flag parameters of corresponding blocks within a neighboring upper macroblock located upper to N blocks K11~K1$n$ according to a coded block pattern.

11. The system according to claim 8, wherein the offset value is calculated by combing the value stored in the first buffer array with double of the value stored in the second buffer array, and the base value is obtained by a lookup table.

12. A method for updating flag parameters in Context Adaptive Binary Arithmetic Coding (CABAC) processing, the method comprising:
- a) providing two buffer arrays having locations corresponding to a plurality of blocks of a macroblock respectively;
- b) storing with first parameters corresponding to a first plurality of blocks along a left most edge of the macroblock in the first buffer array;
- c) storing with second parameters corresponding to a second plurality of blocks along a top most edge of the macroblock in the second buffer array; and
- d) updating the first and second buffer arrays with flag parameters corresponding to the plurality of blocks obtained by an operation performed on each of the plurality of blocks within the macroblock in a specific order;

wherein the specific order is arranged that neighboring left and upper blocks next to a given block are processed prior to the given block;

wherein the step b) further comprises:
- b1) setting the second parameters to 0 on a condition that a neighboring upper block next to the macroblock does not exists;
- b2) setting the second parameters to 0 on conditions that the neighboring upper block exists and is an intra-MB, the macroblock is an inter-MB and is transmitted by data partition, and a constrained inter prediction flag is 1;
- b3) setting the second parameters to 1 on a condition that the neighboring upper macroblock is inter-pulse-coded modulated; and
- b4) setting the second parameters to flag parameters of corresponding blocks within a neighboring upper macroblock located upper to the second blocks respectively according to a coded block pattern on a condition that none of the steps b1)-b3) is executed.

13. The method according to claim 12, wherein the first parameters are set in the same way as the second parameters in response to macroblock adaptive frame/field encoding is not used.

14. The method according to claim 12, wherein the step d) further comprises updating a flag parameter of the given block into a location corresponding to a neighboring right block next to the given block in the first buffer and a location corresponding to a neighboring lower block next to the given block in the second buffer.

15. The method according to claim 14, wherein the operation in the step d) is performed to obtain the flag parameter of the given block according to the values stored in corresponding locations of the first and second buffer arrays.

16. The method according to claim 14, wherein the operation in the step d) further comprises:
- calculating an offset value of the given block by combining the value stored in the first buffer array with double of the value stored in the second buffer array;
- calculating a context ID of the given block by combining the offset value of the given block and a base value obtained from a lookup table; and
- decoding the context ID to obtain the flag parameter of the given block.

* * * * *